(12) United States Patent
Park et al.

(10) Patent No.: US 12,056,901 B2
(45) Date of Patent: Aug. 6, 2024

(54) APPARATUS AND METHOD FOR COMPRESSING FOR COEFFICIENT VALUES OF COMPENSATION EQUATION FOR COMPENSATING FOR DEFECT IN IMAGE AND CIRCUIT FOR COMPENSATING FOR DISPLAY DATA USING COMPRESSION VALUES

(71) Applicant: LX Semicon Co., Ltd., Daejeon (KR)

(72) Inventors: Jun Young Park, Daejeon (KR); Min Ji Lee, Daejeon (KR); Ji Won Lee, Daejeon (KR); Suk Ju Kang, Daejeon (KR); Joo Sung Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 463 days.

(21) Appl. No.: 17/506,361

(22) Filed: Oct. 20, 2021

(65) Prior Publication Data

US 2022/0122295 A1    Apr. 21, 2022

(30) Foreign Application Priority Data

Oct. 20, 2020 (KR) ................. 10-2020-0136143

(51) Int. Cl.
| | | |
|---|---|---|
| *G06T 9/00* | (2006.01) | |
| *G06T 7/00* | (2017.01) | |
| *G06T 11/60* | (2006.01) | |

(52) U.S. Cl.
CPC .............. *G06T 9/00* (2013.01); *G06T 7/0002* (2013.01); *G06T 11/60* (2013.01); *G06T 2207/30168* (2013.01)

(58) Field of Classification Search
CPC ......... G06T 9/00; G06T 7/0002; G06T 11/60; G06T 2207/30168; G09G 3/20;
(Continued)

(56) References Cited

U.S. PATENT DOCUMENTS

| | | |
|---|---|---|
| 6,151,409 A | 11/2000 | Chen et al. |
| 10,170,063 B2 | 1/2019 | Zhang |

(Continued)

FOREIGN PATENT DOCUMENTS

| | | |
|---|---|---|
| KR | 19957001446 A | 3/1995 |
| KR | 20080024796 A | 9/2006 |

(Continued)

OTHER PUBLICATIONS

Bi, Xin, et al.; "A New Mura Defect Inspection Way for TFT-LCD Using Level Set Method"; IEEE Signal Processing Letters; vol. 16, No. 4; Apr. 2009; pp. 311-314.

(Continued)

*Primary Examiner* — Neil R McLean
(74) *Attorney, Agent, or Firm* — POLSINELLI PC

(57) ABSTRACT

The present disclosure discloses an apparatus and method for compressing coefficient values of a compensation equation for compensating for a defect in an image and a circuit for compensating for display data using compression values compressed by the apparatus and method. The apparatus for compressing coefficient values of a compensation equation includes a coefficient value provision unit configured to provide coefficient values of a coefficient of a compensation equation for compensating for a defect in an image and location information for each pixel and a coefficient value compression unit configured to provide a first compression bitmap and a second compression bitmap by sequentially performing first compression and second compression on the coefficient value.

20 Claims, 10 Drawing Sheets

(58) Field of Classification Search
CPC ........... G09G 2330/10; G09G 2360/16; G09G 3/3208; G09G 3/3611; H04N 19/00; H04N 5/21; H04N 17/004
USPC ........................................................ 382/173
See application file for complete search history.

(56) References Cited

U.S. PATENT DOCUMENTS

| | | | |
|---|---|---|---|
| 10,789,870 B2 * | 9/2020 | Kim | ............ G09G 3/006 |
| 2018/0090077 A1 * | 3/2018 | Zou | ............ G09G 3/3406 |

FOREIGN PATENT DOCUMENTS

| | | | | |
|---|---|---|---|---|
| KR | 20070057618 A | 6/2007 | | |
| WO | WO-2020185238 A1 * | 9/2020 | ............... | G06N 3/08 |

OTHER PUBLICATIONS

Delp, Edward J., et al.; "Image Compression Using Block Truncation Coding"; IEEE Transactions on Communications; vol. COM-27, No. 9; Sep. 1979; pp. 1335-1342.

Kim, Jong-hak, et al.; "Efficient Hardware Implementation of Real-time Rectification using Adaptively Compressed LUT"; Journal of Semiconductor Technology and Science; vol. 16, No. 1; Feb. 2016; pp. 44-57.

Lema, Maximo D., et al.; "Absolute Moment Block Truncation Coding and Its Application to Color Images"; IEEE Transactions on Communications; vol. COM-32, No. 10; Oct. 1984; pp. 1148-1157.

Mathews, Jayamol, et al.; "Modified BTC Algorithm for Gray Scale Images using max-min Quantizer"; IEEE Xplore; 2013; pp. 377-382.

* cited by examiner

APPARATUS AND METHOD FOR COMPRESSING FOR COEFFICIENT VALUES OF COMPENSATION EQUATION FOR COMPENSATING FOR DEFECT IN IMAGE AND CIRCUIT FOR COMPENSATING FOR DISPLAY DATA USING COMPRESSION VALUES

BACKGROUND

1. Technical Field

The present disclosure relates to the compression of coefficient values of a compensation equation for compensating for a defect in an image, and more particularly, to an apparatus and method for compressing coefficient values of a compensation equation for compensating for a defect in an image and a circuit for compensating for display data using compression values compressed by the apparatus and method.

2. Related Art

Recently, an LCD panel or an OLED panel is used a lot as a display panel.

The display panel may have a defect, such as Mura, in an image for a reason, such as an error, etc. in a manufacturing process.

For example, a Mura failure means that a spot having non-uniform luminance occurs in a specific pixel or some area of a display panel.

A defect in an image may be increased as the size of a display panel is increased, and acts as an important factor in determining quality of the display panel.

Therefore, a defect needs to be effectively compensated for in order to improve quality of a display panel.

A defect in an image may be improved by compensating for luminance for each pixel of display data. To this end, a driver that drives a display panel may be configured to include a defect compensation unit for compensating for a defect in an image based on previously stored compensation information.

The defect compensation unit may compensate for luminance of received display data for each pixel based on compensation information. The driver may drive the display panel by using the compensated display data.

The defect compensation unit may be configured to perform defect compensations by using a preset compensation equation. For example, the compensation equation may be configured as a quadratic expression.

A degree of compensation for luminance for each pixel may be determined by coefficient values of the compensation equation. Therefore, the compensation information stored in the driver may include coefficient values for each pixel, which will be applied to the compensation equation.

As the size of the display panel increases, the amount of compensation information for compensating for defects in all images increases. As the amount of the compensation information increases, a high-capacity memory is required. Therefore, the compensation information needs to be compressed in order to reduce the capacity of a memory.

If compensation information is compressed at a high compression ratio and an area selected for compression is large, artifact may occur between compressed areas.

In order to prevent such artifact, compensation information needs to be efficiently compressed in a way to have association between adjacent pixels or blocks.

SUMMARY

Various embodiments are directed to providing an apparatus and method for compressing coefficient values of a compensation equation for compensating for a defect in an image, which can reduce a memory capacity by efficiently compressing, for each pixel, coefficient values of a compensation equation for compensating for a defect in an image.

Also, various embodiments are directed to providing an apparatus and method for compressing coefficient values of a compensation equation for compensating for a defect in an image, which can prevent the occurrence of artifact between compressed areas and efficiently compress coefficient values of a compensation equation for each pixel in a way to have association between adjacent pixels or blocks.

Furthermore, various embodiments are directed to providing a circuit for compensating for display data, which can solve a defect in an image by compensating for luminance for each pixel based on compression values that are efficiently compressed as described above.

In an embodiment, an apparatus for compressing coefficient values of a compensation equation for compensating for a defect in an image may include a coefficient value provision unit configured to provide coefficient values of a coefficient of a compensation equation for compensating for a defect in an image and location information for each pixel; and a coefficient value compression unit configured to provide a first compression bitmap and a second compression bitmap by sequentially performing first compression and second compression on the coefficient value.

In this case, the coefficient value compression unit, by the first compression, may construct a first two-dimensional (2-D) table for the coefficient values based on the location information, may generate the first compression bitmap having first compression values obtained by compressing the coefficient values of the first 2-D table, and may generate representative values for restoring the first compression values. And, the coefficient value compression unit, by the second compression, may construct second 2-D tables for the representative values based on the location information, and may generate the second compression bitmaps having second compression values obtained by compressing the representative values of the second 2-D tables.

In an embodiment, a method of compressing coefficient values of a compensation equation for compensating for a defect in an image may include a first step of receiving, as a first one-dimensional (1-D) table, coefficient values of coefficients of a compensation equation, constructed as a quadratic expression and for compensating for a defect in an image, and location information for each pixel, for each of the coefficients; and a second step of dividing the image into a plurality of block areas, sequentially performing first compression and second compression for each block area, and providing a first compression bitmap and a second compression bitmap.

In this case, the first compression may include constructing a first two-dimensional (2-D) table for the coefficient values of the first 1-D table based on the location information; calculating a total average of the coefficient values of the first 2-D table and generating the first compression bitmap by mapping a first compression value as a preset value corresponding to a value greater than or smaller than the total average for each of the coefficient values; and generating a first representative value and a second representative value for restoring the first compression values of the first compression bitmap and providing second 1-D tables including the location information in common and separately having the first representative value and the second representative value. Furthermore, the second compression may include constructing the second 2-D tables in each of which the first representative value and second representative value of the second 1-D tables are separately mapped for each pixel based on the location information; and calculating a difference value between current data and next data of continuous data and generating the second compression bitmaps by mapping the second compression value to the next data as the difference value.

In an embodiment, an apparatus for compensating for display data may include a compression bitmap storage unit configured to store and provide a first compression bitmap having first compression values and second compression bitmaps separately having second compression values each corresponding to a first representative value and a second representative value; a coefficient value generation unit configured to generate coefficient values of a compensation equation for compensating for a defect in an image for each pixel based on the first compression values of the first compression bitmap and the second compression values of the second compression bitmaps and to provide the coefficient value for each pixel; and a defect compensation unit configured to receive display data and the coefficient values for each pixel, compensate for the display data for each pixel by using the compensation equation to which the coefficient values have been applied, and output the compensated display data.

The present disclosure can efficiently compress coefficient values for each pixel, which will be applied to a compensation equation for compensating for a defect in an image by sequential compressions and can reduce a memory capacity.

Furthermore, the present disclosure can prevent artifact between compressed areas from occurring and efficiently compress coefficient values of a compensation equation for each pixel in a way to have association between adjacent pixels or blocks.

Furthermore, the present disclosure has effects in that it can solve a defect in an image because the driver that drives a display panel in order to display an image compensates for luminance for each pixel based on compression values efficiently compressed as described above.

DETAILED DESCRIPTION

A defect including Mura having a spot form, may occur in an image on a display panel for a reason, such as an error, etc. in a manufacturing process.

Figure 1:
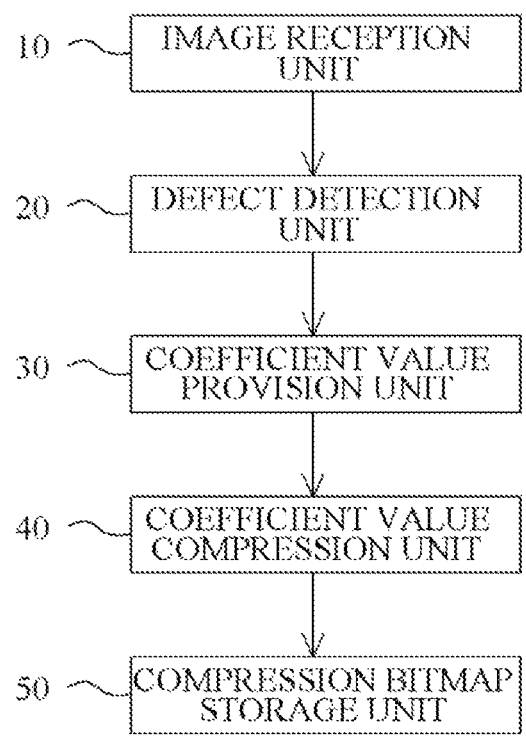
FIG. 1 is a block diagram illustrating an apparatus for compressing coefficient values of a compensation equation for compensating for a defect in an image according to a preferred embodiment of the present disclosure.

The defect may be analyzed by an apparatus of FIG. 1 according to an embodiment. Correction information based on a result of the analysis may be compressed and then stored.

Referring to FIG. 1, the apparatus for compressing coefficient values of a compensation equation may be illustrated as including an image reception unit 10, a defect detection unit 20, a coefficient value provision unit 30, a coefficient value compression unit 40 and a compression bitmap storage unit 50.

The image reception unit 10 is to receive an accurately detected image of a test image displayed on a display panel (not illustrated) in order to detect a defect and to provide the received image.

The defect detection unit 20 is to compare a received image with a previously stored reference image, for example, for a test, to detect defect information for each pixel as a result of the comparison, and to provide the defect information.

The coefficient value provision unit 30 receives defect information for each pixel, and generates coefficient values in accordance with the defect information for each pixel.

The present disclosure may illustrate that a defect in an image is compensated for using a compensation equation configured as a quadratic expression. In this case, the compensation equation may be understood as Equation 1 below.

$$Y=aX^2+bX+C \qquad \text{[Equation 1]}$$

In Equation 1, Y is a luminance value of a pixel to be compensated for. X is a normal luminance value of a pixel. That is, Y may be understood as a difference value between a defective luminance value and normal luminance value of a pixel. Furthermore, coefficients of each dimension of the compensation equation are represented as "a", "b" and "c."

The coefficient value provision unit 30 generates the coefficients "a", "b" and "c" corresponding to defect information for each pixel with respect to the coefficients of the compensation equation for compensating for a defect in an image, and provides location information and the coefficient values for each pixel. In this case, the coefficient value provision unit 30 may provide the coefficient values and location information for each pixel by constructing the coefficient values and the location information in the form of a first one-dimensional (1-D) table.

The coefficient value compression unit 40 may sequentially perform first compression and second compression on coefficient values provided by the coefficient value provision unit 30 based on location information, and as a result, may provide a first compression bitmap and second compression bitmaps. In this case, the first compression bitmap based on the first compression may be understood as a bitmap in which the coefficient values have been compressed. The second compression bitmaps may be understood as bitmaps in which representative values generated by the first compression have been compressed.

The compression bitmap storage unit 50 may store a first compression bitmap and second compression bitmaps, that is, the results of compression provided by the coefficient value compression unit 40, and may provide the first compression bitmap and the second compression bitmaps to a driver to be described later depending on a manufacturer's intention.

An embodiment of the present disclosure can efficiently compress, as a first compression bitmap and second compression bitmaps, coefficient values for each pixel to be applied to the compensation equation through sequential compression, and as a result, can reduce a memory capacity.

Furthermore, an embodiment of the present disclosure can efficiently compress coefficient values for each pixel in a way to have association between adjacent pixels or blocks by changing one-dimensional (1-D) coefficient values into two-dimensional (2-D) coefficient values in order to prevent artifact between compressed areas from occurring. To this end, the coefficient value compression unit 40 may be configured to sequentially perform first compression and second compression.

The coefficient value compression unit 40 first performs the first compression. In the first compression, the coefficient value compression unit 40 configures a first 2-D table for coefficient values based on location information of a pixel, generates a first compression bitmap having first compression values obtained by compressing the coefficient values of the first 2-D table, and generates representative values for restoring the first compression values.

Furthermore, the coefficient value compression unit 40 performs the second compression subsequently to the first compression. In the second compression, the coefficient value compression unit 40 configures second 2-D tables for representative values based on location information, and generates second compression bitmaps having second compression values obtained by compressing the representative values of the second 2-D tables.

The coefficient value compression unit 40 may generate the first compression bitmap and the second compression bitmaps through the sequential first compression and second compression.

In an embodiment of the present disclosure, location information may be assigned for each pixel. Coefficient values for each pixel may be matched with location information.

Furthermore, an embodiment of the present disclosure may divide the entire image into a plurality of block areas for efficient compression, may sequentially perform first compression and second compression for each block area, and may provide a first compression bitmap and second compression bitmaps.

As described above, the first compression bitmap and the second compression bitmaps obtained for each block area may be stored in the compression bitmap storage unit 50 in a way to be mapped to the entire image and provided.

Figure 2:
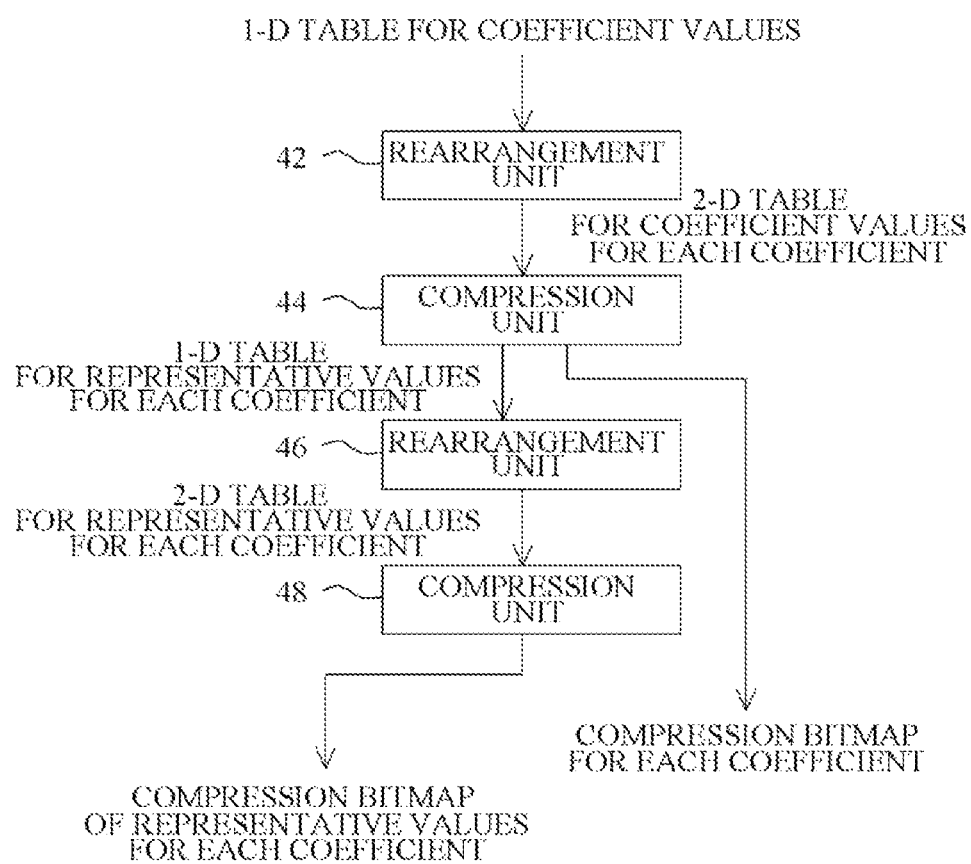
FIG. 2 is a block diagram illustrating a preferred embodiment of a coefficient value compression unit in FIG. 1.

The coefficient value compression unit 40 for sequential compression according to an embodiment of the present disclosure may be configured as in FIG. 2. An operation of the coefficient value compression unit 40 illustrated in FIG. 2 may be described with reference to FIGS. 3 to 8.

The coefficient value compression unit 40 includes a rearrangement unit 42 and a compression unit 44 for first compression and a rearrangement unit 46 and a compression unit 48 for second compression.

The rearrangement unit 42 is for constructing a 2-D table for coefficient values (hereinafter referred to as a "first 2-D table") based on location information.

More specifically, the rearrangement unit 42 receives, from the coefficient value provision unit 30, a 1-D table having coefficient values and location information for each pixel (hereinafter referred to as a "first 1-D table"). The first 1-D table may be illustrated as in FIG. 3, and may be arranged to have coefficient values of the coefficients "a", "b" and "c" of each dimension of the compensation equation and location information for each pixel.

The rearrangement unit 42 constructs the first 2-D table for each coefficient of the first 1-D table. For example, a first 2-D table Ta is constructed in accordance with the coefficient "a", and coefficient values of the coefficient "a" are mapped for each piece of location information. That is, the first 2-D table Ta is constructed by mapping the coefficient values of the coefficient "a" of the first 1-D table for each pixel based on the location information. Furthermore, a first 2-D table Tb is constructed in accordance with the coefficient "b", and coefficient values of the coefficient "b" are mapped for each piece of location information. That is, the first 2-D table Tb is constructed by mapping the coefficient values of the coefficient "b" of the first 1-D table for each pixel based on the location information. Furthermore, a first 2-D table Tc is constructed in accordance with the coefficient "c", and coefficient values of the coefficient "c" are mapped for each piece of location information. That is, the first 2-D table Tc is constructed by mapping the coefficient values of the coefficient "c" of the first 1-D table for each pixel based on the location information.

If an image, that is, a target to be compressed, is configured to include M columns and N rows, a first 2-D table for each coefficient may be configured to have an M*N matrix structure.

The compression unit 44 may divide the entire image into a plurality of block areas and perform first compression for each block area.

Figure 4:
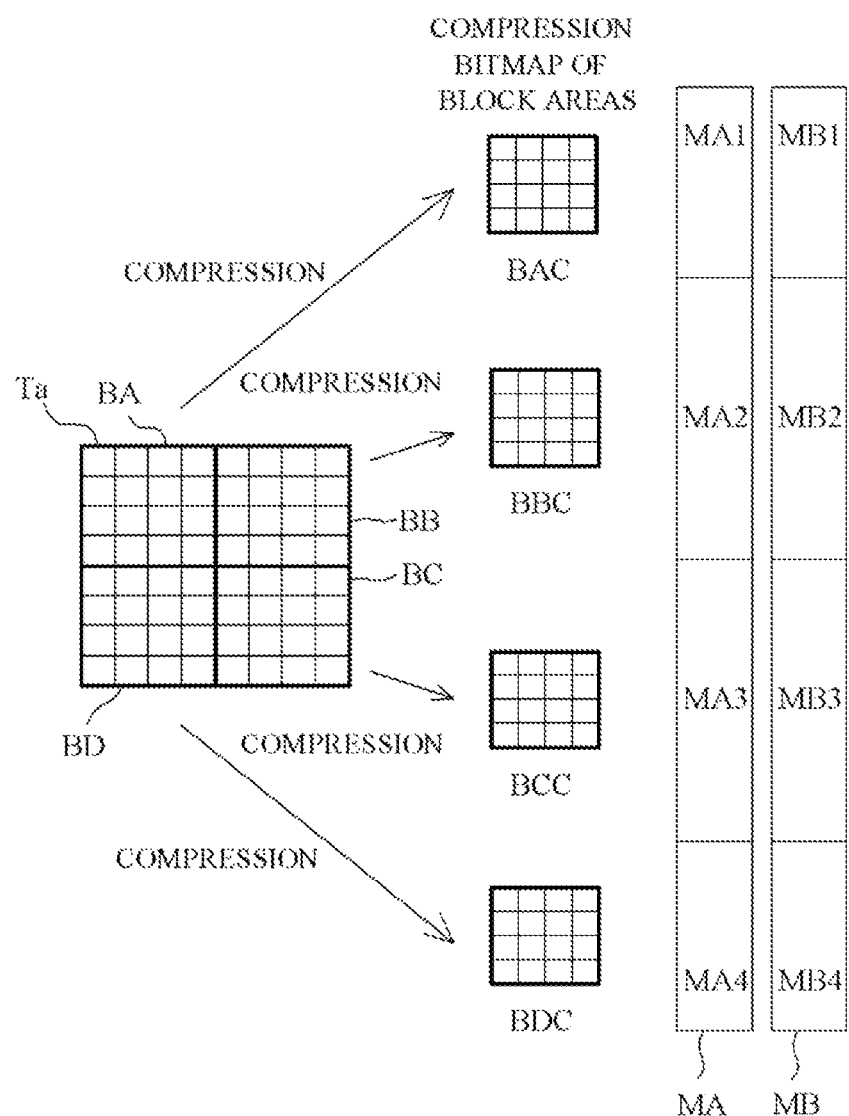
FIG. 4 is a diagram for describing an operation of a compression unit 44.

Referring to FIG. 4, the first 2-D table Ta is illustrated in accordance with the coefficient "a", and the first 2-D table Ta is divided into four block areas BA, BB, BC and BD. In this case, each of the block areas BA, BB, BC and BD may have an M/4*N/4 matrix structure.

The compression unit 44 may perform compression for each block area of the first 2-D table Ta. As a result, first compression bitmaps BAC, BBC, BCC and BDC corresponding to the four block areas BA, BB, BC and BD, respectively, and two moments may be generated.

In this case, the moment is a representative value for restoring a first compression value of a first compression bitmap for each pixel. A first moment including a first representative value and a second moment including a second representative value may generated for each block area (hereinafter a first moment is referred to as a first representative value, and a second moment is referred to as a second representative value).

That is, a first representative value MA1 and a second representative value MB1 are generated in accordance with the compression of the block area BA. A first representative value MA2 and a second representative value MB2 are generated in accordance with the compression of the block area BB. A first representative value MA3 and a second representative value MB3 are generated in accordance with the compression of the block area BC. A first representative value MA4 and a second representative value MB4 are generated in accordance with the compression of the block area BD.

The first representative values MA1, MA2, MA3 and MA4 may be constructed as one 1-D table (hereinafter referred to as a "second 1-D table") MA. The second representative values MB1, MB2, MB3 and MB4 may be configured as another second 1-D table MB. A first representative value and a second representative value corresponding to the same block area are separately configured in the second 1-D table MA and the second 1-D table MB while having the same block location information. In this case, the first representative value and the second representative value may be understood as sharing block location information. In this case, the block location information may be understood as an address indicative of a corresponding block area.

That is, one second 1-D table MA may have the four first representative values MA1, MA2, MA3 and MA4 for the four block areas BA, BB, BC and BD and respective pieces of block location information. Another second 1-D table MB may have the four second representative values MB1, MB2, MB3 and MB4 for the four block areas BA, BB, BC and BD and respective pieces of block location information.

The compression unit 44 calculates a total average of coefficient values for each of the block areas BA, BB, BC and BD of the first 2-D table Ta corresponding to the coefficient "a", and performs first compression in which a first compression value is mapped as a preset value corresponding to a value greater than or smaller than the total average for each of the coefficient values of the block areas BA, BB, BC and BD. As a result, the compression unit 44 may generate the first compression bitmaps BAC, BBC, BCC and BDC corresponding to the block areas BA, BB, BC and BD, respectively.

Furthermore, the compression unit 44 generates the first representative values MA1, MA2, MA3 and MA4 and the second representative value MB1, MB2, MB3 and MB4 for restoring first compression values for the first compression bitmaps BAC, BBC, BCC and BDC for each of the block areas BA, BB, BC and BD in parallel to the first compression. Furthermore, the compression unit 44 generates the second 1-D table MA having the first representative values MA1, MA2, MA3 and MA4 corresponding to the block areas BA, BB, BC and BD, respectively, and pieces of block location information and the second 1-D table MB having the second representative values MB1, MB2, MB3 and MB4 corresponding to the block areas BA, BB, BC and BD, respectively, and pieces of block location information.

That is, the compression unit 44 generates the first compression bitmap BAC to which first compression values are mapped in accordance with the block area BA, and the first representative value MA1 and the second representative value MB1, generates the first compression bitmap BBC to which first compression values are mapped in accordance with the block area BB, and the first representative value MA2 and the second representative value MB2, generates the first compression bitmap BCC to which first compression values are mapped in accordance with the block area BC, and the first representative value MA3 and the second representative value MB3, and generates the first compression bitmap BDC to which first compression values are mapped in accordance with the block area BD, and the first representative value MA4 and the second representative value MB4. Furthermore, the first representative values MA1, MA2, MA3 and MA4 and the second representative values MB1, MB2, MB3 and MB4 for each of the block areas BA, BB, BC and BD are separately stored in the second 1-D tables MA and MB sharing block location information.

The compression unit 44 may perform the first compression by using one of block truncation coding (BTC) or absolute moment block truncation coding (AMBTC) using a total average.

In the case of BTC, in the first 2-D table Ta, a total average $\tilde{X}$ and a standard deviation a may be calculated for each of the four block areas BA, BB, BC and BD. The total average $\tilde{X}$ and the standard deviation a may be calculated by Equation 2 below.

$$\tilde{x} = \frac{1}{m}\sum_{1}^{m} x_i, \qquad [\text{Equation 2}]$$

$$\sigma = \sqrt{\frac{1}{m}\sum_{1}^{m}(x_i - \tilde{x})^2}$$

In Equation 2, m is the number of all pixels in a block area, and $x_i$ is an i-th coefficient value.

Furthermore, in the first compression, the first compression bitmaps BAC, BBC, BCC and BDC for the respective four block areas BA, BB, BC and BD of the first 2-D table Ta are generated by assigning and mapping "1" when a coefficient value is greater than the total average $\tilde{X}$ for each pixel of each block area, and are generated by assigning and mapping "0" when a coefficient value is smaller than the total average $\tilde{X}$ for each pixel of each block area. As a result, the first compression bitmaps BAC, BBC, BCC and BDC corresponding to the four block areas BA, BB, BC and BD of the first 2-D table Ta, respectively, have "0" or "1" as a first compression value for each pixel.

Furthermore, a first representative value α and a second representative value β may be calculated by Equation 3 below for each of the four block areas BA, BB, BC and BD of the first 2-D table Ta.

$$\alpha = \tilde{x} + \sigma\sqrt{\frac{m-q}{q}}, \qquad [\text{Equation 3}]$$

$$\beta = \tilde{x} - \sigma\sqrt{\frac{q}{m-q}}$$

In Equation 3, q is a number having a value greater than the total average.

That is, the first representative value α is a representative value of coefficient values each greater than the total average $\tilde{X}$, and may be understood as a value obtained by adding, to the total average $\tilde{X}$, an average standard deviation of the coefficient values each greater than the total average $\tilde{X}$. Furthermore, the second representative value β is a representative value of coefficient values each smaller than the total average $\tilde{X}$, and may be understood as a value obtained by subtracting, from the total average $\tilde{X}$, an average standard deviation of coefficient values each smaller than the total average $\tilde{X}$.

The first representative value α and the second representative value β are used to restore a first compression value approximately to the original.

The first representative value α is generated for each of the four block areas BA, BB, BC and BD of the first 2-D table Ta. The second 1-D table MA is configured to include four first representative values α for the four block areas BA, BB, BC and BD, respectively, and pieces of block location information. Furthermore, the second representative value β is generated for each of the four block areas BA, BB, BC and BD of the first 2-D table Ta. The second 1-D table MB is configured to include four second representative value β for the four block areas BA, BB, BC and BD, respectively, and pieces of block location information.

In the case of AMBTC, in the first 2-D table Ta, the total average $\tilde{X}$ may be calculated for each of the four block areas BA, BB, BC and BD.

Furthermore, the first compression bitmaps BAC, BBC, BCC and BDC for the respective four block areas BA, BB, BC and BD of the first 2-D table Ta by the first compression are generated by assigning and mapping "1" when a coefficient value is greater than the total average $\tilde{X}$ for each pixel of each block area, and are generated by assigning and mapping "0" when a coefficient value is smaller than the total average $\tilde{X}$ for each pixel of each block area. As a result, the first compression bitmaps BAC, BBC, BCC and BDC corresponding to the four block areas BA, BB, BC and BD of the first 2-D table Ta, respectively, have "0" or "1" as a first compression value for each pixel.

Furthermore, the first representative value a and the second representative value b may be calculated by Equation 4 below for each of the four block areas BA, BB, BC and BD of the first 2-D table Ta.

$$a = \frac{1}{q}\sum_{x_i > \tilde{x}} x_i,$$
$$b = \frac{q}{m-q}\sum_{x_i < \tilde{x}} x_i,$$

[Equation 4]

That is, the first representative value a is a representative value of coefficient values each greater than the total average $\tilde{X}$, and may be understood as an average of the coefficient values each greater than the total average $\tilde{X}$. The second representative value b is a representative value of coefficient values each smaller than the total average $\tilde{X}$, and may be understood as an average of coefficient values each smaller than the total average $\tilde{X}$.

The first representative value a and the second representative value b are also used to restore a first compression value approximately to the original.

The first representative value a is also generated for each of the four block areas BA, BB, BC and BD of the first 2-D table Ta. The second 1-D table MA is configured to include four first representative value a for the four block areas BA, BB, BC and BD, respectively, and pieces of block location information. Furthermore, the second representative value b is also generated for each of the four block areas BA, BB, BC and BD of the first 2-D table Ta. The second 1-D table MB is configured to include four second representative value b for the four block areas BA, BB, BC and BD, respectively, and pieces of block location information.

Figure 5:
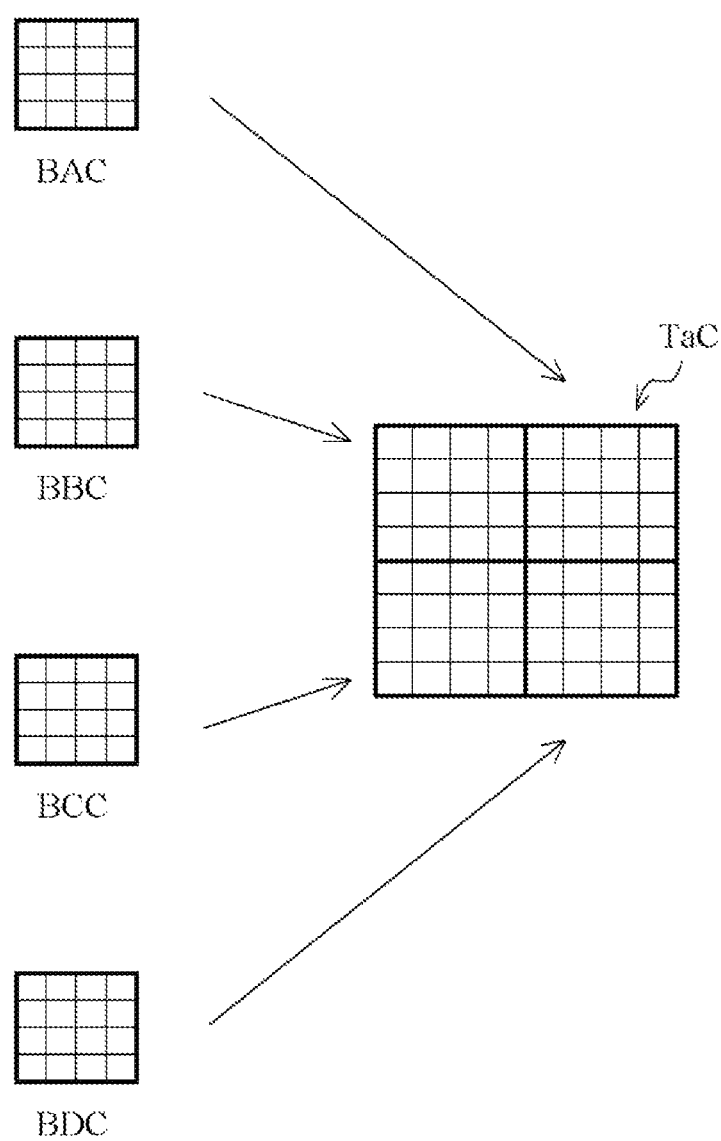
FIG. 5 is a diagram illustrating that first compression bitmaps of block areas are reconstructed as one image and stored in a compression bitmap storage unit 50.

The first compression bitmaps BAC, BBC, BCC and BDC generated by the compression unit 44 may be reconstructed as one compression bitmap TaC in a way to correspond to the first 2-D table Ta for the coefficient "a" of the entire image as in FIG. 5, and may be stored in the compression bitmap storage unit 50.

The rearrangement unit 46 constructs second 2-D tables in each of which a first representative value and a second representative value sharing block location information are separately mapped for each of the four block areas BA, BB, BC and BD.

More specifically, the rearrangement unit 46 receives the second 1-D tables MA and MB including location information in common for each of the four block areas BA, BB, BC and BD and separately having the first representative values MA1, MA2, MA3 and MA4 and the second representative values MB1, MB2, MB3 and MB4 for each block location.

Figure 6:
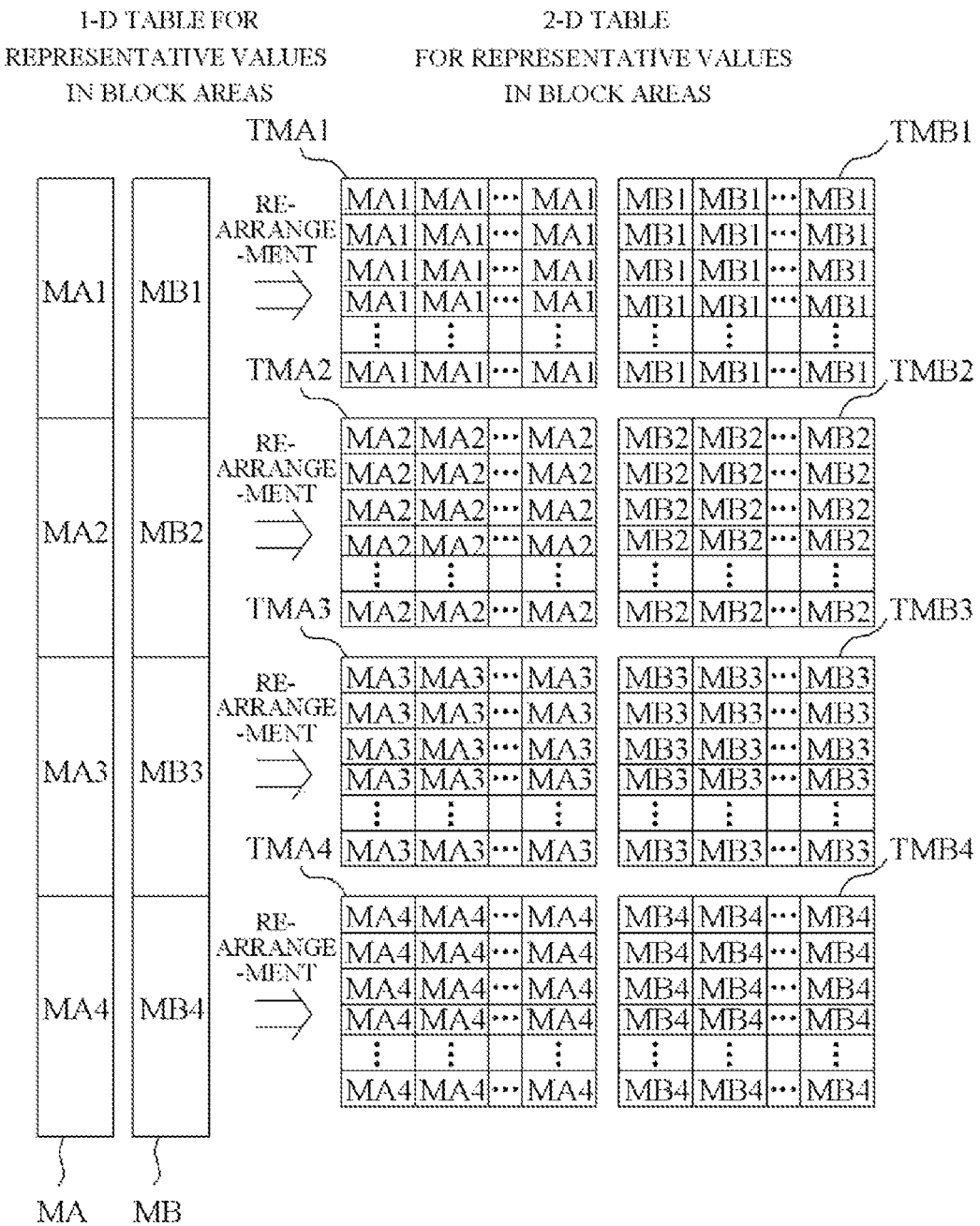
FIG. 6 is a diagram for describing an operation of a rearrangement unit 46 in FIG. 2.

As in FIG. 6, the rearrangement unit 46 constructs second 2-D tables TMA1, TMA2, TMA3, TMA4, TMB1, TMB2, TMB3 and TMB4 corresponding to block location information of the second 1-D tables MA and MB.

The second 2-D table TMA1 is constructed by mapping the first representative value MA1 matched with block location information of the block area BA of the second 1-D tables MA for each pixel. More specifically, since a first representative value for the block area BA is MA1, the second 2-D table TMA1 is constructed so that the first representative value MA1 is mapped to all pixels. The second 2-D table TMB1 is constructed by mapping the second representative value MB1 matched with block location information of the block area BA of the second 1-D tables MB for each pixel. More specifically, since a second representative value for the block area BA is MB1, the second 2-D table TMB1 is constructed so that the second representative value MB1 is mapped to all pixels.

Each of the second 2-D tables TMA2 and TMB2 for the first representative value MA2 and second representative value MB2 of the block area BB, the second 2-D tables TMA3 and TMB3 for the first representative value MA3 and second representative value MB3 of the block area BC, and the second 2-D tables TMA4 and TMB4 for the first representative value MA4 and second representative value MB4 of the block area BD may also be constructed like the second 2-D tables TMA1 and TMB1 for the first representative value MA1 and second representative value MB1 of the block area BA.

Figure 7:
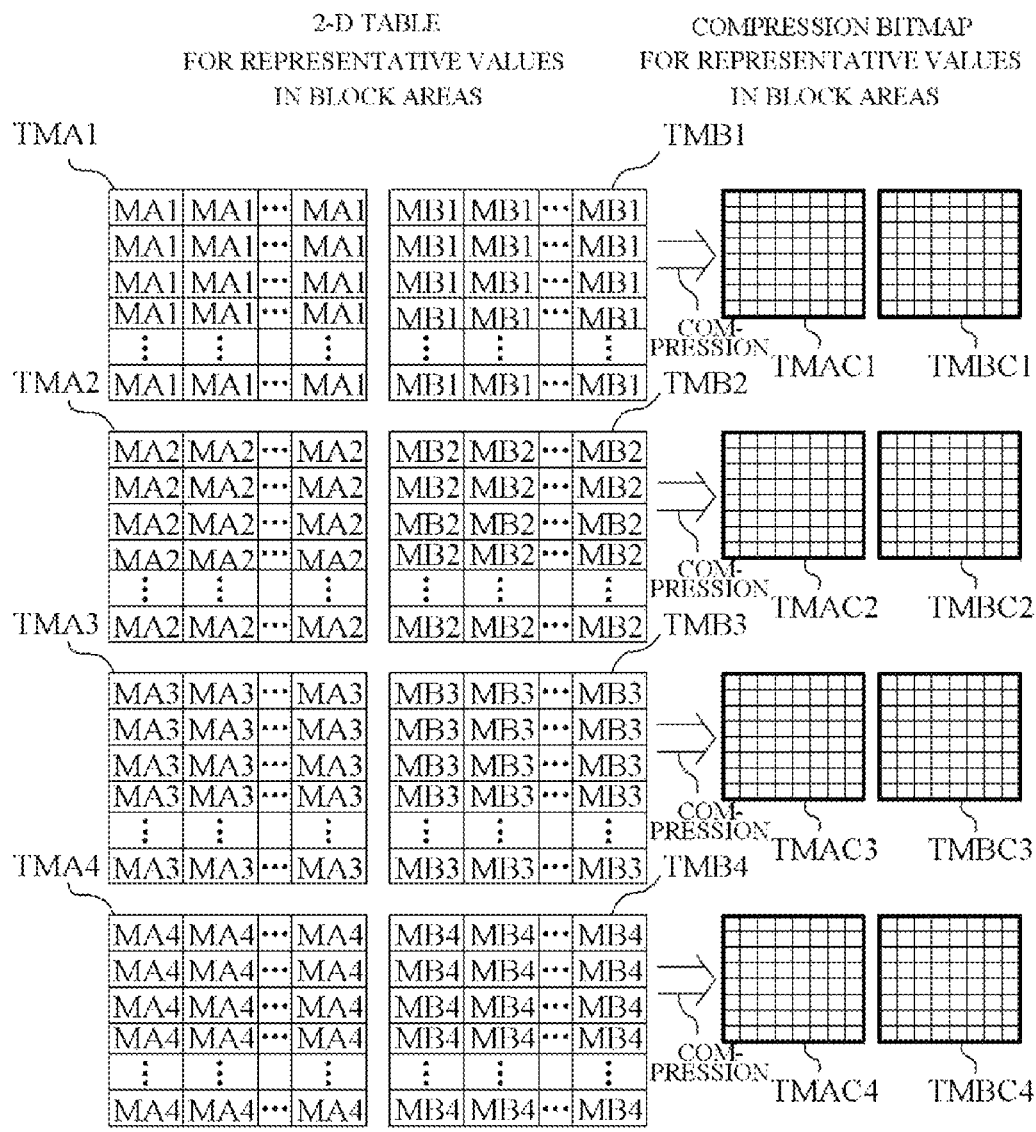
FIG. 7 is a diagram for describing an operation of a compression unit 48.

The compression unit 48 receives the second 2-D tables TMA1, TMA2, TMA3, TMA4, TMB1, TMB2, TMB3 and TMB4 in FIG. 6, and performs second compression on the second 2-D tables as in FIG. 7.

The compression unit 48 generates second compression bitmaps TMAC1, TMAC2, TMAC3, TMAC4, TMBC1, TMBC2, TMBC3 and TMBC4 by calculating a difference value between current data and next data of continuous data within the second 2-D tables TMA1, TMA2, TMA3, TMA4, TMB1, TMB2, TMB3 and TMB4 and mapping a second compression value for the next data to the difference value.

In this case, the compression unit 48 may store, as the original, the first data of each of the second 2-D tables TMA1, TMA2, TMA3, TMA4, TMB1, TMB2, TMB3 and TMB4, and may store the second compression bitmaps TMAC1, TMAC2, TMAC3, TMAC4, TMBC1, TMBC2, TMBC3 and TMBC4 so that a difference value after the first data has the number of bits smaller than that of the first data.

Furthermore, the compression unit 48 can prevent an error from being increased and propagated by using a method of calculating a difference value between current data and next data of data that is sequentially continuous in the transverse and longitudinal directions of the second 2-D tables TMA1, TMA2, TMA3, TMA4, TMB1, TMB2, TMB3 and TMB4.

Figure 8:
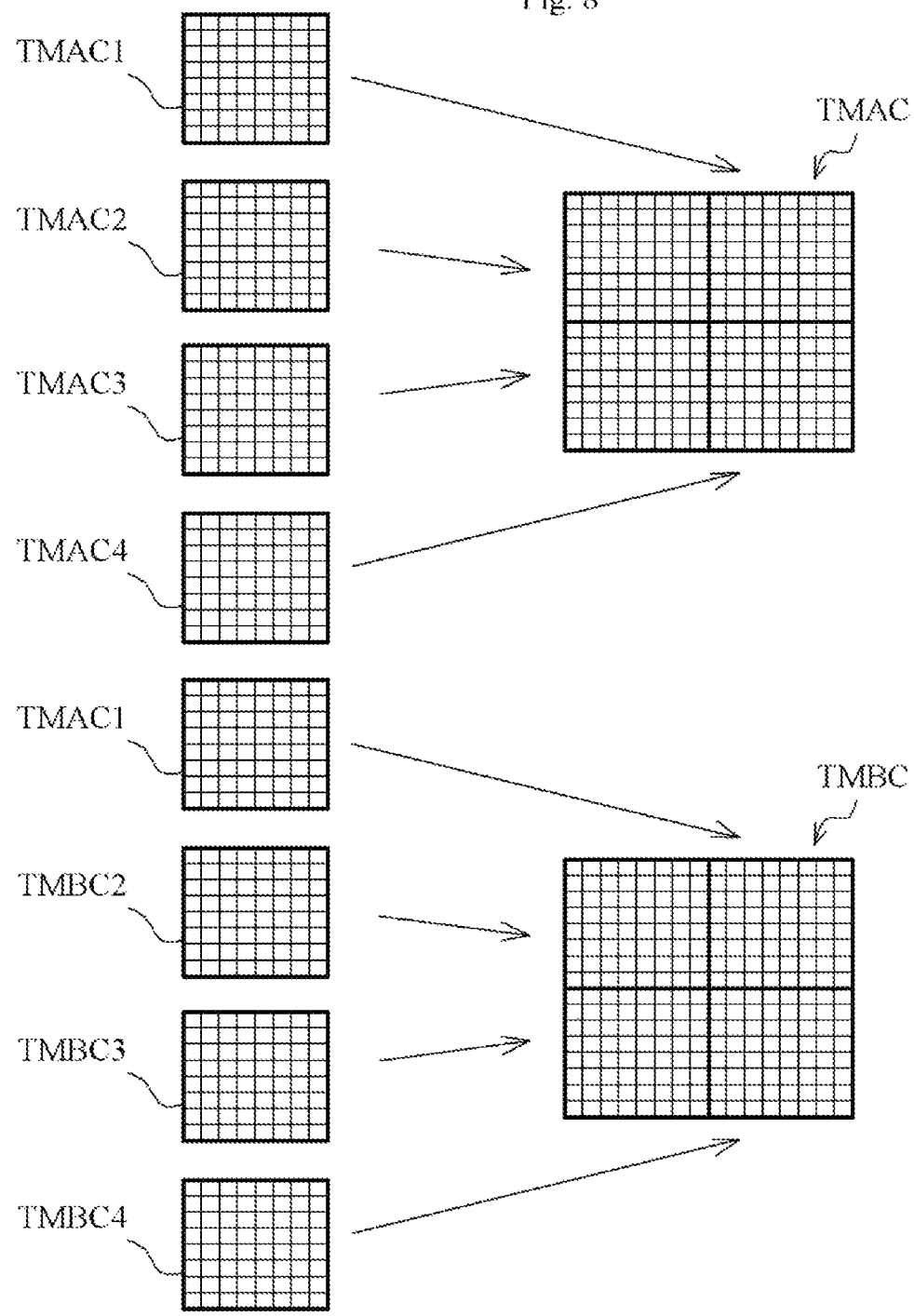
FIG. 8 is a diagram illustrating that second compression bitmaps of block areas are reconstructed as one image and stored in the compression bitmap storage unit 50.

The second compression bitmaps TMAC1, TMAC2, TMAC3, TMAC4, TMBC1, TMBC2, TMBC3 and TMBC4 generated by the compression unit 48 may be reconstructed as one compression bitmap TMAC and TMBC for each representative value in a way to correspond to the first 2-D tables Ta for the coefficient "a" of the entire image as in FIG. 8, and may be stored in the compression bitmap storage unit 50.

According to the apparatus and method for compressing coefficient values of the compensation equation for compensating for a defect in an image according to the present disclosure, adjacent data can have association because 1-D data is changed into 1-D data having the same ratio as that of a displayed image. Accordingly, efficient compression can be guaranteed.

Furthermore, in an embodiment of the present disclosure, a conversion and compression process for one coefficient has been described, but a compression bitmap may be calculated by performing conversion and compression on the remaining coefficients in the same manner. Accordingly, the present disclosure has an advantage in that it can flexibly handle a sensitive portion in compensating for a defect because a degree of a compression loss may be different for each coefficient.

The present disclosure can reduce a memory capacity because coefficient values of the compensation equation for compensating for a defect in an image for each pixel can be efficiently compressed through two sequential compressions.

Furthermore, according to the present disclosure, the occurrence of artifact between compressed areas for each block area can be prevented by compression. Coefficient values of the compensation equation can be efficiently compressed for each pixel in a way to have association between adjacent pixels or blocks.

The present disclosure may be configured to solve a defect in an image by compensating for luminance for each pixel by using compression values efficiently compressed as described above.

Figure 9:
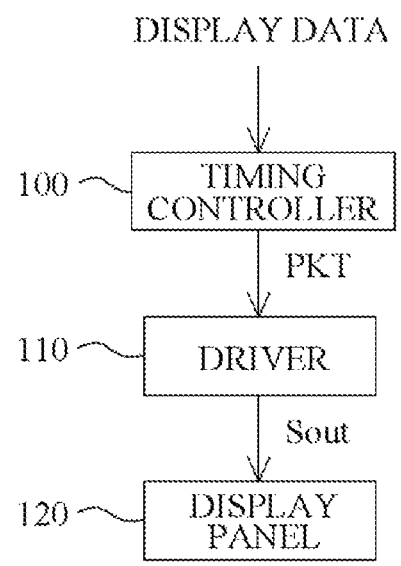
FIG. 9 is a block diagram illustrating a display system.

That is, a first compression bitmap and second compression bitmaps calculated by the present disclosure may be stored in a driver 110 that drives a display panel 120 in FIG. 9. The driver 110 can solve a defect in an image by compensating for display data by using the first compression bitmap and the second compression bitmaps.

As in FIG. 9, the display data is provided to a timing controller 100. The timing controller 100 constructs a packet PKT for the display data and provides the packet to the driver 110.

The driver 110 is configured to restore the display data after receiving the packet, generate a source signal Sout corresponding to the display data, and provide the source signal to the display panel 120.

Figure 10:
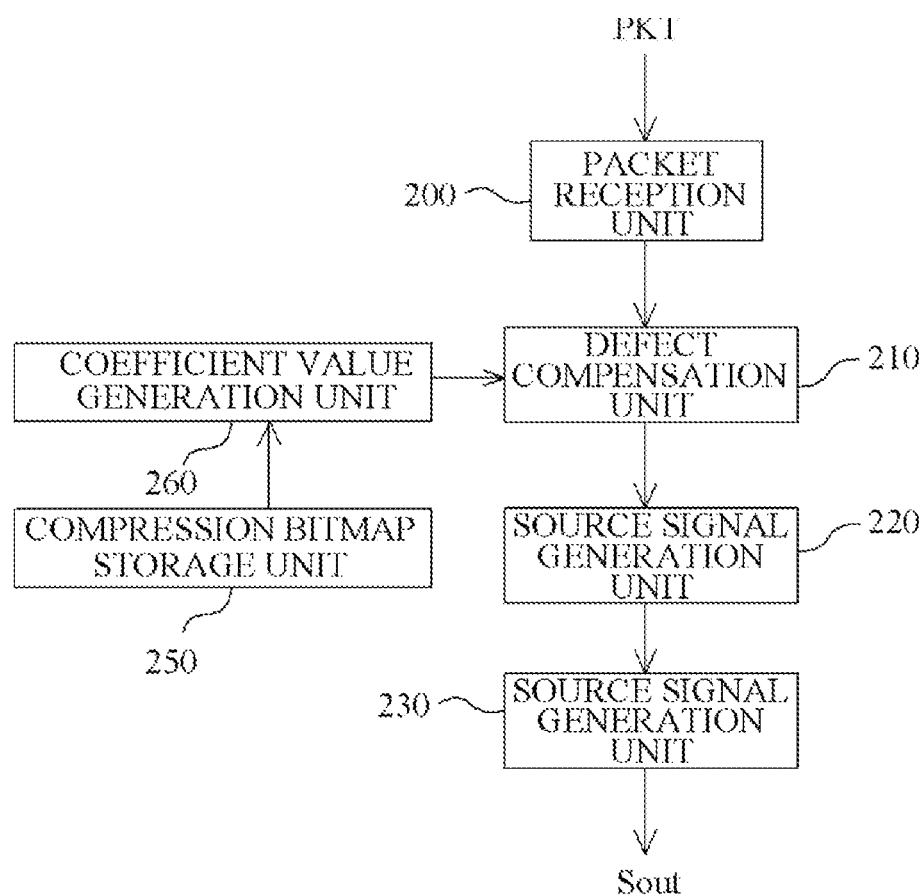
FIG. 10 is a block diagram illustrating a circuit for compensating for display data according to an embodiment of the present disclosure, which is configured in the driver in FIG. 9.

The driver 110 in FIG. 9 may be configured as in FIG. 10, for example.

Referring to FIG. 10, the driver 110 may include a packet reception unit 200, a defect compensation unit 210, a source signal generation unit 220, a source signal output unit 230, a compression bitmap storage unit 250 and a coefficient value generation unit 260.

The packet reception unit 200 receives a packet PKT for display data provided by the timing controller 100 and restores the display data from the packet PKT.

The defect compensation unit 210 has a construction for compensating for a defect based on the compensation equation of Equation 1, and compensates for display data so that a defect is solved by applying coefficient values for each pixel provided by the coefficient value generation unit 260.

The source signal generation unit 220 drives a source signal in accordance with the compensated display data. The source signal output unit 230 provides the display panel 120 with the source signal Sout driven by the source signal generation unit 220.

The compression bitmap storage unit 250 may be configured using a memory, such as an EEPROM, and provides the coefficient value generation unit 260 with the first compression bitmap and the second compression bitmaps generated through the processes described with reference to FIGS. 2 to 8. In this case, the first compression bitmap and the second compression bitmaps may be divided and provided for each block area.

The first compression bitmaps BAC, BBC, BCC and BDC have first compression values of coefficients of a corresponding block area for each pixel. The second compression bitmaps TMAC1 and TMBC1, TMAC2 and TMBC2, TMAC3 and TMBC3, and TMAC4 and TMBC4 corresponding to the block areas BA, BB, BC, and BD, respectively, have second compression values each corresponding to a first representative value and a second representative value for each pixel.

The coefficient value generation unit 260 is configured to generate coefficient values of the compensation equation for compensating for a defect in an image for each pixel by using the first compression values of the first compression bitmap and the second compression values of the second compression bitmaps and to provide the defect compensation unit 210 with the coefficient values of the coefficients for each pixel. More specifically, the coefficient value generation unit 260 first releases the compression of the second compression bitmaps TMAC1 and TMBC1, TMAC2 and TMBC2, TMAC3 and TMBC3, and TMAC4 and TMBC4.

That is, the coefficient value generation unit 260 generates second 2-D tables separately having the first representative values MA1, MA2, MA3 and MA4 and the second representative values MB1, MB2, MB3 and MB4 for each block area as the second compression bitmaps TMAC1 and TMBC1, TMAC2 and TMBC2, TMAC3 and TMBC3, and TMAC4 and TMBC4. In this case, the second 2-D tables may be generated to separately have the first representative value and the second representative value for each pixel by mapping the first data of the second compression bitmap as the original and adding current data and next data of continuous data. To generate the second 2-D tables as the second compression bitmaps corresponds to a reverse order of the order illustrated in FIG. 7.

Furthermore, the coefficient value generation unit 260 releases the compression of the first compression bitmaps BAC, BBC, BCC and BDC.

That is, the coefficient value generation unit 260 calculates the first representative values MA1, MA2, MA3 and MA4 and second representative values MB1, MB2, MB3 and MB4 of the first compression bitmaps BAC, BBC, BCC and BDC for each pixel in the second 2-D tables TMA1 and TMB1, TMA2 and TMB2, TMA3 and TMB3, and TMA4 and TMB4.

Furthermore, the coefficient value generation unit 260 releases the compression of the first compression values of the first compression bitmaps BAC, BBC, BCC and BDC based on the first representative values MA1, MA2, MA3 and MA4 and the second representative values MB1, MB2, MB3 and MB4.

Figure 3:
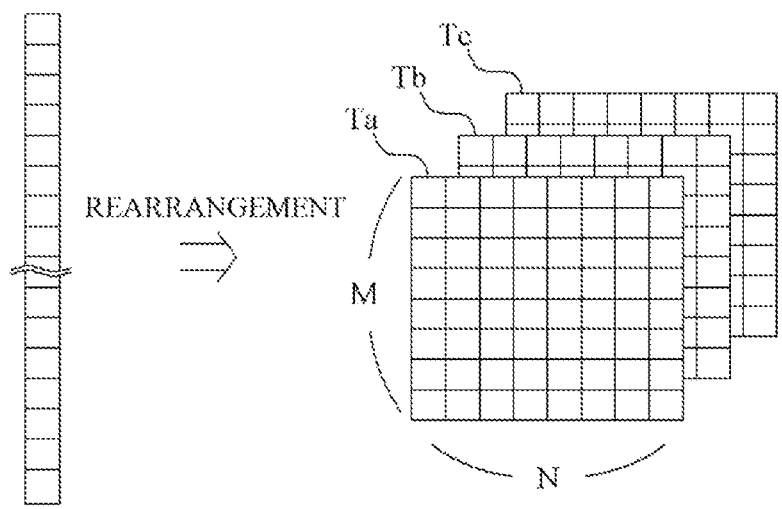
FIG. 3 is a diagram for describing an operation of a rearrangement unit 42 in FIG. 2.

Specifically, the coefficient value generation unit 260 may generate the first 2-D table of FIG. 3 having a restored grayscale value for each pixel by mapping a first representative value of a corresponding block area when a first compression value is "1" and mapping a second representative value of a corresponding block area when a first compression value is "0." That is, the coefficient value generation unit 260 may generate a first 2-D table having coefficient values for each pixel by mapping, to first compression values of the first compression bitmaps BAC, BBC, BCC and BDC in FIG. 4, a representative value that belongs to a first representative value and a second representative value and that corresponds to the first compression value. Such a process corresponds to a reverse order in which the first 2-D table of FIG. 3 is compressed into the first compression bitmaps BAC, BBC, BCC and BDC in FIG. 4.

Furthermore, the coefficient value generation unit 260 may extract coefficient values and location information of an image for each pixel by performing the procedure for each of coefficients of the compensation equation.

As described above, according to the present disclosure, the coefficient value generation unit 260 may provide coefficient values having location information with respect to coefficients.

The defect compensation unit 210 may perform compensation on display data by substituting the compensation equation of Equation 1 into coefficient values of coefficients for each pixel which are provided by the coefficient value generation unit 260 as described above.

Accordingly, the apparatus for compressing coefficient values of a compensation equation for compensating for a defect in an image according to the present disclosure can store and provide coefficient values by using a memory having a small capacity, and can prevent artifact and excellently compensate for a defect based on compression values having association between neighboring data by using 2-D compression bitmaps having the same ratio as those of an image.

What is claimed is:

1. An apparatus for compressing coefficient values of a compensation equation for compensating for a defect in an image, the apparatus comprising:
   a coefficient value provision unit configured to provide coefficient values of a coefficient of a compensation equation for compensating for a defect in an image and location information for each pixel; and
   a coefficient value compression unit configured to provide a first compression bitmap and a second compression bitmap by sequentially performing first compression and second compression on the coefficient values,
   wherein the coefficient value compression unit, by the first compression, constructs a first two-dimensional (2-D) table for the coefficient values based on the location information, generates the first compression bitmap having first compression values obtained by compressing the coefficient values of the first 2-D table, and generates representative values for restoring the first compression values; and, wherein the coefficient value compression unit, by the second compression, constructs second 2-D tables for the representative values based on the location information, and generates the second compression bitmaps having second compression values obtained by compressing the representative values of the second 2-D tables.

2. The apparatus of claim 1, wherein:
   the coefficient value provision unit provides the coefficient values of the coefficients of the compensation equation constructed as a quadratic expression and the location information for each pixel, and
   the coefficient value compression unit sequentially performs the first compression and the second compression for each coefficient and provides the first compression bitmaps and the second compression bitmaps.

3. The apparatus of claim 1, wherein the coefficient value provision unit constructs and provides, as a first one-dimensional (1-D) table, the coefficient values and the location information for each pixel.

4. The apparatus of claim 1, wherein the coefficient value compression unit divides an entire image into a plurality of block areas, sequentially performs the first compression and the second compression for each block area, and provides the first compression bitmap and the second compression bitmaps.

5. The apparatus of claim 4, wherein the coefficient value compression unit provides the first compression bitmap and the second compression bitmaps by mapping the first compression bitmap and the second compression bitmaps to the entire image for each block area.

6. The apparatus of claim 1, wherein the coefficient value compression unit comprises:
   a first rearrangement unit configured to construct the first 2-D table for the coefficient values based on the location information;
   a first compression unit configured to calculate a total average of the coefficient values of the first 2-D table, generate the first compression bitmap by the first compression in which the first compression value is mapped as a preset value corresponding to a value greater than or smaller than the total average for each of the coefficient values and to generate a first representative value and a second representative value for restoring the first compression values of the first compression bitmap;
   a second rearrangement unit configured to construct the second 2-D tables in each of which the first representative value and the second representative value are separately mapped for each pixel based on the location information; and
   a second compression unit configured to calculate a difference value between current data and next data of continuous data and to generate the second compression bitmaps by the second compression in which the second compression value of the next data is mapped as the difference value.

7. The apparatus of claim 6, wherein the first rearrangement unit
   receives a first one-dimensional (1-D) table having the coefficient values and the location information for each pixel, and
   constructs the first 2-D table in which the coefficient values of the first 1-D table are mapped in accordance with the location information.

8. The apparatus of claim 6, wherein the first compression unit generates the first compression bitmap in which the first compression value is mapped as "1" in accordance with the coefficient values each greater than the total average and the second compression value is mapped as "0" in accordance with the coefficient values each smaller than the total average.

9. The apparatus of claim 6, wherein the first compression unit
   generates the first representative value as a value obtained by adding, to the total average, a first average standard deviation of coefficient values each greater than the total average, and
   generates the second representative value as a value obtained by subtracting, from the total average, a second average standard deviation of coefficient values each smaller than the total average.

10. The apparatus of claim 6, wherein the first compression unit
    generates the first representative value as an average of coefficient values each greater than the total average, and generates the second representative value as an average of coefficient values each smaller than the total average.

11. The apparatus of claim 6, wherein the second rearrangement unit receives second 1-D tables comprising the location information in common and separately having the first representative value and the second representative value, and constructs the second 2-D table in which the first representative value and second representative value of the second 1-D table are separately mapped in accordance with the location information.

12. The apparatus of claim 6, wherein:

the second compression unit stores first data of the second 2-D tables as an original, and a difference value after the first data is stored to have the number of bits smaller than the number of bits of the first data.

13. The apparatus of claim 6, wherein the second compression unit stores first data of the second 2-D tables as an original, and calculates the difference value between the current data and the next data of data sequentially continuous in a transverse direction and longitudinal direction of the second 2-D tables.

14. A method of compressing coefficient values of a compensation equation for compensating for a defect in an image, the method comprising:

a first step of receiving, as a first one-dimensional (1-D) table, coefficient values of coefficients of a compensation equation, constructed as a quadratic expression and for compensating for a defect in an image, and location information for each pixel, for each of the coefficients; and a second step of dividing the image into a plurality of block areas, sequentially performing first compression and second compression for each block area, and providing a first compression bitmap and a second compression bitmap, wherein the first compression comprises:

constructing a first two-dimensional (2-D) table for the coefficient values of the first 1-D table based on the location information;

calculating a total average of the coefficient values of the first 2-D table and generating the first compression bitmap by mapping a first compression value as a preset value corresponding to a value greater than or smaller than the total average for each of the coefficient values; and generating a first representative value and a second representative value for restoring the first compression values of the first compression bitmap and providing second 1-D tables comprising the location information in common and separately having the first representative value and the second representative value, and the second compression comprises:

constructing a second 2-D tables in each of which the first representative value and second representative value of the second 1-D tables are separately mapped for each pixel based on the location information; and calculating a difference value between current data and next data of continuous data and generating the second compression bitmaps by mapping the second compression value to the next data as the difference value.

15. The method of claim 14, wherein the first compression bitmap is generated by mapping the first compression value as "1" in accordance with the coefficient values each greater than the total average and mapping the second compression value as "0" in accordance with the coefficient values each smaller than the total average.

16. The method of claim 14, wherein:

the first representative value is generated as a value obtained by adding, to the total average, a first average standard deviation of coefficient values each greater than the total average, and the second representative value is generated as a value obtained by subtracting, from the total average, a second average standard deviation of coefficient values each smaller than the total average.

17. The method of claim 14, wherein:

the first representative value is generated as an average of coefficient values each greater than the total average, and the second representative value is generated as an average of coefficient values each smaller than the total average.

18. The method of claim 14, wherein:

the second compression unit stores first data of the second 2-D tables as an original, and the difference value after the first data is stored to have a number of bits smaller than a number of bits of the first data.

19. An apparatus for compensating for display data using compression values, the apparatus comprising:

a compression bitmap storage unit configured to store and provide a first compression bitmap having first compression values and second compression bitmaps separately having second compression values each corresponding to a first representative value and a second representative value;

a coefficient value generation unit configured to generate coefficient values of a compensation equation for compensating for a defect in an image for each pixel based on the first compression values of the first compression bitmap and the second compression values of the second compression bitmaps and to provide the coefficient value for each pixel; and a defect compensation unit configured to receive display data and the coefficient values for each pixel, compensate for the display data for each pixel by using the compensation equation to which the coefficient values have been applied, and output the compensated display data.

20. The apparatus of claim 19, wherein the coefficient value generation unit constructs second two-dimensional (2-D) tables each having the first representative value and the second representative value for each pixel by mapping first data as an original with respect to the second compression bitmaps having the second compression values and adding current data and next data of continuous data, selects, as a representative value, one of the first representative value and second representative value of the second 2-D tables for each pixel based on the first compression value of the first compression bitmap for each pixel and generates a first 2-D table in which the coefficient value corresponding to the representative value has been mapped for each pixel, and provides location information and the coefficient value for each pixel as the first 2-D table.

* * * * *